Oct. 18, 1938.     J. J. GREBE ET AL     2,133,616

PROCESS FOR RECOVERING BROMINE

Filed March 1, 1937

INVENTORS
John J. Grebe
Leonard C. Chamberlain
BY
Griswold & Burdick ATTORNEYS

Patented Oct. 18, 1938

2,133,616

UNITED STATES PATENT OFFICE 2,133,616

PROCESS FOR RECOVERING BROMINE

John J. Grebe and Leonard C. Chamberlain, Midland, Mich., assignors to The Dow Chemical Company, Midland, Mich., a corporation of Michigan Application March 1, 1937, Serial No. 128,419

8 Claims. (Cl. 23—216)

The present invention relates to processes for recovering bromine from sea water, natural brines, bitterns, and the like. It is particularly concerned with processes of the general type in which the brine or equivalent solution containing the bromine in combined form is oxidized to liberate the bromine in the elemental state, the latter vaporized and separated from the liquor by blowing out with a gas current, and the bromine recovered from the gas current by contacting with a suitable absorbent agent.

In processes of the foregoing type, especially when the bromine content is very small, it is usually necessary to acidify the brine prior to liberating the bromine, owing to the fact that the natural brines containing bromine are almost invariably alkaline, and the quantitative liberation of the free bromine can take place only in an acid medium. The consumption of acid for acidifying the brine in such processes is normally a major item of expense. It is desirable, therefore, to provide a process in which mineral acids, such as hydrochloric or sulphuric acid, will not be required to acidify the brine.

The gas customarily employed for blowing out the free bromine from the brine is air, both on account of availability, low cost and simplicity of operation. However, we have found that, by substituting carbon dioxide for air in the blowing-out step, it is possible by suitable procedure to avoid the necessity for use of mineral acid to acidify the brine and to accomplish both the acidification of the brine and blowing-out of the bromine by means of one and the same agent.

It is, therefore, an object of the invention to provide a process of the character aforementioned in which carbon dioxide may be employed both for acidifying the raw brine and for vaporizing and blowing-out the free bromine from the oxidized brine. Other objects and advantages will appear as the description proceeds. Our invention is fully described in the annexed drawing and following specification.

In said annexed drawing:—

By saturating an alkaline brine containing dissolved bromides with carbon dioxide under suitable pressure we have found that a sufficient degree of acidity can be produced in the brine, so that the bromine can be liberated quantitatively therein in the elemental state by oxidation. Such bromine can then be vaporized and removed from the brine by blowing out by means of carbon dioxide. This can be accomplished in various ways. For example, a current of carbon dioxide gas may be passed through the carbonated and oxidized brine while the latter is held under sufficient pressure to maintain the proper acidity of the brine. According to another procedure the brine is carbonated under a sufficiently high pressure, so that, following oxidation to liberate the bromine, the partial release of pressure on the carbonated and oxidized brine results in vaporizing and blowing-out the free bromine, due to the evolution of carbon dioxide when the pressure is reduced. In either case the bromine vapors may then be removed from the carbon dioxide gas in the known manner by passing the mixed gas and vapors through an absorber or scrubber of suitable type already familiar in the art.

Figure 2:
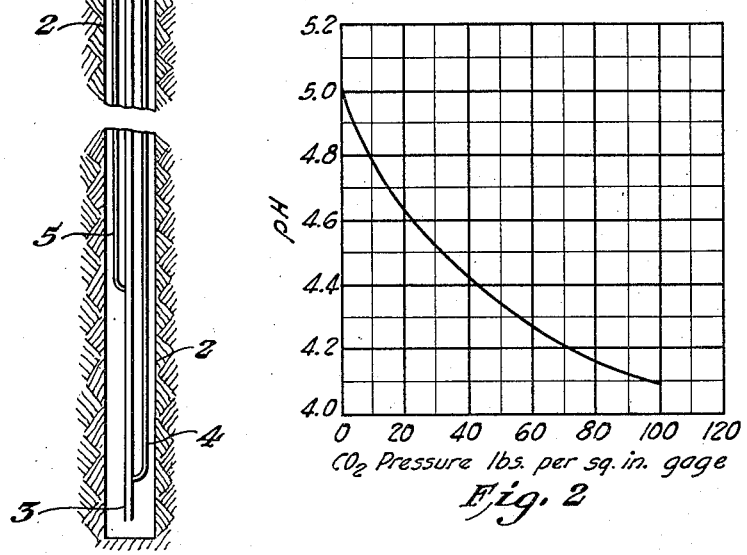
Fig. 2 is a curve sheet showing the variation of acidity of a brine saturated with carbon dioxide at different pressures.

The degree of acidity, expressed as pH value, which can be produced in a brine, e. g., sea water, saturated with carbon dioxide at varying pressures is shown by the curve in Fig. 2. At atmospheric pressure the pH value is approximately 5. As the saturation pressure is increased the pH value is lowered progressively until at 100 pounds per square inch superatmospheric pressure the pH value is about 4.1. In the oxidation of a brine to liberate bromine a pH value between 4 and 4.7 is suitable, corresponding to a pressure of from about two atmospheres to 8 atmospheres, or more.

In carrying out our process the brine is carbonated under a pressure of two atmospheres or more, and during the succeeding stages is maintained under a pressure of at least two atmospheres until the liberated bromine has been separated from the brine. Otherwise the acidity of the brine would be lowered to a point where a portion of the free bromine may be recombined chemically and its vaporization prevented. Hence in practice the pressure on the carbonated brine is not permitted to fall below 15 pounds gauge, and in general a residual pressure of 20 to 30 pounds is maintained, while at times the pressure may be higher than that.

We prefer to employ a saturating pressure high enough to provide a sufficient pressure differential so that, when the acidified and oxidized brine under the higher pressure is passed into a suitable expansion chamber with reduction of pressure to about 15 to 30 pounds gauge, or thereabouts, the evolution of carbon dioxide will be sufficient to vaporize at least a major proportion of the free bromine. The evolved gas is then passed through an absorber to remove the bromine. The debrominated gas may be used in one or more further blowing-out stages, if desired, to remove residual bromine from the brine, such further stages being likewise conducted under pressure sufficient to maintain the required acidity of the brine. After the bromine has been removed from the gas following such secondary blowing-out stage, it can be recompressed to a suitable higher pressure and returned to the saturating step for reuse in the process.

The brine, which has been stripped of free bromine in the primary and secondary blowing-out stages and is still under pressure on the order of 15 to 30 pounds gauge, is discharged into an expansion chamber where the pressure is reduced to that of the atmosphere, thereby releasing a further amount of carbon dioxide from solution in the brine. Such recovered carbon dioxide can also be recompressed and added to that recovered from the absorption step. If desired, the exhaustion of carbon dioxide from the discharged brine can be increased by expanding into a zone of pressure lower than atmospheric. The carbon dioxide employed for acidifying the brine and blowing out the free bromine, therefore, may be continually recycled in the process, and only sufficient make-up gas is needed to compensate for mechanical losses and that chemically combined in the brine.

Figure 1:
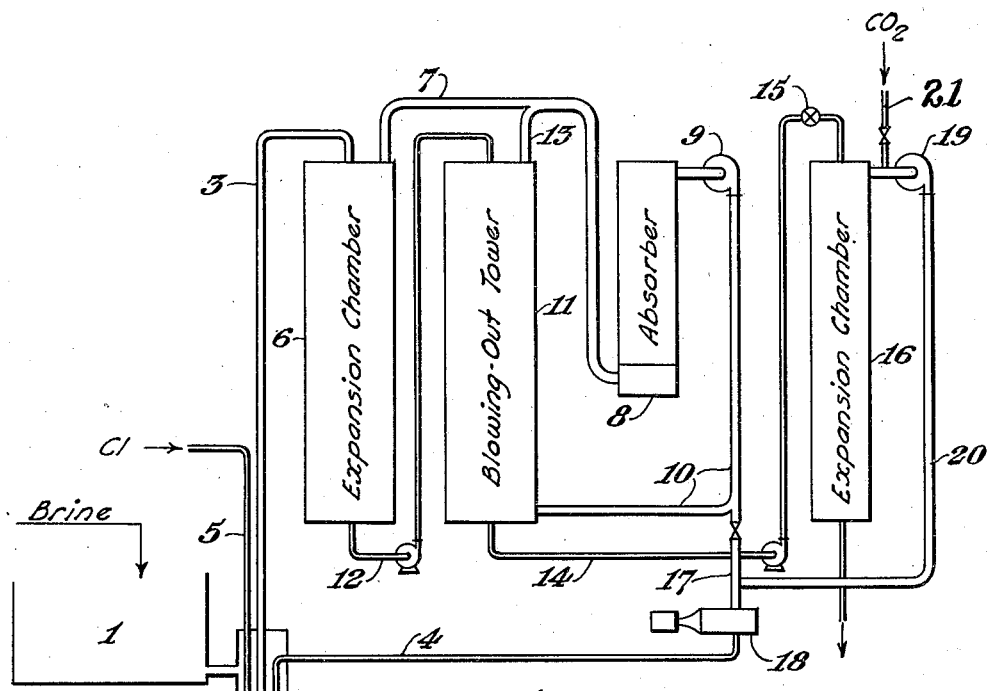
Fig. 1 is a diagrammatic illustration of one arrangement of apparatus adapted for carrying out a preferred embodiment of the invention.

One mode of carrying out the process of our invention is illustrated in Fig. 1 of the drawing. The alkaline brine containing dissolved bromides, after clarification and filtration, if necessary, is stored in a supply tank 1, from which it flows into a vertical water-leg 2, conveniently sunk to a suitable depth in the earth. The depth of water-leg 2 will be such as to provide a sufficient hydrostatic head of brine to produce at the bottom the pressure required for saturating the brine with carbon dioxide, a practical depth being from 100 to 150 feet. A riser pipe 3 extends into the water-leg to a point near the bottom. Just above the lower end of pipe 3 is connected a smaller pipe 4 through which carbon dioxide under pressure is admitted within pipe 3. Still higher is another side connection pipe 5 through which chlorine is admitted into pipe 3.

With water-leg 2 standing full of brine, carbon dioxide is introduced at a sufficient rate into the brine standing in pipe 3 to saturate the brine at the pressure due to the hydrostatic head, and also to act as a gas lift to raise the brine inside of pipe 3. When saturated with carbon dioxide under sufficient pressure, e. g., 40 to 100 pounds gauge, the brine is acidified to a pH value between approximately 4.4 and 4.1. In practice a pressure of 4 atmospheres (45 pounds gauge) or more, is suitable. Thereupon chlorine is introduced into the acidified brine through pipe 5 in amount regulated to correspond to the bromine content of the brine, or slightly in excess of the theoretical amount, thereby liberating the bromine in the brine. Riser pipe 3 projects upwardly above the top of water-leg 2 and connects with the top of an expansion chamber or tower 6, which may be filled with a suitable packing material. The saturated and chlorinated brine in pipe 3 is raised by the gas lift to the top of tower 6, wherein it is released into the expansion chamber, which is maintained under a back pressure of about 15 to 30 pounds gauge (2 to 3 atmospheres). The reduction of pressure on the saturated brine in tower 6 causes a copious evolution of carbon dioxide gas which carries with it a large proportion of the free bromine, depending upon the pressure differential between the saturated brine in pipe 3 and in tower 6. The evolved gas and vapors pass from tower 6 through pipe 7 to absorber 8. Absorber 8 may be of the dry type, wherein the gas stream is passed through a body of active charcoal or other adsorbent material which removes the bromine from the gas by adsorption. The absorber, however, may also be of the scrubber type in which the bromine is absorbed by a liquid solvent therefor. The recovery of the halogen from the adsorbing agent or from the solvent, as the case may be, is effected in usual manner known to the art.

The gas from absorber 8, having been stripped of the bromine contained therein and still under pressure, is driven by blower or pump 9 through pipe 10 to the base of a blowing-out tower 11, of usual type, wherein it is used to blow out residual free bromine from the brine. The brine from chamber 6 is conveyed by pipe 12 to the top of tower 11, wherein it passes downwardly in countercurrent to the rising gas current introduced at the base of the tower through pipe 10, a body of packing material being conveniently provided in the tower to secure good distribution of the liquid therein. The gas containing the vaporized bromine passes out at the top of tower 11 through pipe 13, which connects into pipe 7, so that the exit gas from tower 11 also is conducted to absorber 8 to strip the bromine therefrom. The debrominated brine is forwarded from the bottom of tower 11 through pipe 14, in which is an expansion valve 15, to an expansion chamber 16, where the pressure is reduced to atmospheric, or below, to flash off carbon dioxide still dissolved therein. The decarbonated brine flows to waste from the bottom of chamber 16.

A portion of the carbon dioxide gas from absorber 8, stripped of halogen and still under the pressure of the blowing-out and absorbing stages, is continuously bled off through valve-regulated pipe 17 to a compressor 18 where it is recompressed to the initial pressure and returned to the process through pipe 4 to water-leg 2 for use in carbonating further quantities of raw brine. The carbon dioxide gas recovered in chamber 16 is withdrawn by exhaust fan 19 and forwarded to compressor 18 through pipe 20. Additional carbon dioxide to make up for losses may be introduced conveniently at inlet 21.

It will be seen that a portion of the carbon dioxide liberated in expansion chamber 6, after being stripped of bromine, is constantly recycled through the blowing-out tower 11 for removing residual free bromine from the brine, while the remainder of the gas is withdrawn through pipe 17 to be recompressed and returned to the saturating step. In this way a smaller amount of carbon dioxide can be used to acidify the brine than would be required to vaporize all of the bromine in the expansion chamber, the recycled gas making up any deficiency in the blowing-out tower. The proportions of gas recycled and withdrawn for recompression can be adjusted to suit operating conditions by regulating the valve in pipe 17. Thus two carbon dioxide cycles are provided in the process, a minor cycle in which a portion of the gas is recycled at moderate pressure, e. g., 15 to 30 pounds gauge, to vaporize residual bromine from the brine, and a major cycle in which the gas recovered from the process is recompressed to a higher pressure and returned to the initial saturation step.

The described procedure may be varied in details, as will be apparent to those skilled in the art. Naturally other mechanical means known to the art can be employed for saturating the incoming brine with carbon dioxide under pressure, for instance by use of a pressure tank for the brine into which carbon dioxide is pumped under sufficient pressure.

Instead of saturating the brine with carbon dioxide at a relatively high pressure and then reducing the pressure in the above described manner to vaporize bromine by the spontaneous generation of gas accompanying such pressure reduction, we may simply carbonate the brine at the lower pressure in the first place and then, after liberating the bromine, bubble additional gas through the saturated brine at about the same pressure, to blow out the liberated bromine. In other respects the procedure would be similar to that already described.

The oxidation of the brine, as by chlorinating, can be done either before or after the brine is carbonated. If done before, the bromine of course would not be liberated as long as the brine was alkaline, but only after it had been acidified by absorption of sufficient carbon dioxide.

Some natural bromide-containing brines may be strongly alkaline due to their content of alkali carbonate. In such case it would probably be economical to neutralize the carbonate with mineral acid and thereby generate a corresponding amount of carbon dioxide for use in the process. The addition of acid to decompose the carbonate would be carried out with the brine under sufficient pressure to hold the carbon dioxide in solution, thereby supplementing the carbon dioxide supplied to the process for acidifying the brine and vaporizing the bromine therefrom.

A particular advantage of the herein described novel process for extracting bromine from alkaline natural brines, sea water, or the like, is that the carbon dioxide employed for the acidification of the brine and the blowing-out of the liberated halogen can be recovered in large measure and recycled in the process. By maintaining the system under superatmospheric pressure during saturation with carbon dioxide, oxidation, vaporization of bromine and absorption of the latter, the saturated brine is held at a sufficient degree of acidity to permit of the liberation of free bromine and its removal from the brine by vaporization in the manner shown.

When a steady source of carbon dioxide under sufficient pressure is available to a process of the character in hand, it may not be necessary to recompress the gas after it has been used in the process, such gas being recovered in other ways and used for other purposes, if desired. For example, in the working up of brines occurring in natural gas producing regions for the extraction of bromine, in some cases there may be available from gas wells a natural gas sufficiently high in carbon dioxide to serve the purposes of the present process, and under suitable pressure.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. A process of extracting bromine from an alkaline brine which comprises acidifying such brine by saturating with carbon dioxide under pressure materially in excess of 2 atmospheres, oxidizing to liberate free bromine in the brine, reducing the pressure on the carbonated brine to not less than 2 atmospheres to cause an evolution of carbon dioxide gas which simultaneously vaporizes the bromine, and passing the mixed gas and vapors through an absorbent medium to separate the bromine from the accompanying gas.

2. A process of extracting bromine from an alkaline brine which comprises saturating such brine with carbon dioxide under superatmospheric pressure sufficient to produce in the brine an acid reaction corresponding to a pH value lower than about 4.4, oxidizing to liberate free bromine in the brine, reducing the pressure to not less than 2 atmospheres to cause an evolution of carbon dioxide gas which simultaneously vaporizes a portion of the bromine, passing the evolved gas in countercurrent to such brine to vaporize additional bromine therefrom, absorbing the vaporized bromine from the gas, recompressing the residual carbon dioxide and returning the same to the first step.

3. In a process of extracting bromine from a bromide-containing solution, the steps which consist in saturating such solution with carbon dioxide under superatmospheric pressure, oxidizing such saturated solution to liberate free bromine therein, and partially releasing the pressure on the oxidized solution to vaporize bromine therefrom along with the evolved carbon dioxide.

4. A process of extracting bromine from a bromide-containing solution which comprises saturating such solution with carbon dioxide under pressure of at least 4 atmospheres, oxidizing such saturated solution to liberate free bromine therein, reducing the pressure on the solution to between about 2 and 3 atmospheres to cause an evolution of carbon dioxide which simultaneously vaporizes the bromine, and separating the bromine from carbon dioxide.

5. A process of extracting bromine from a bromide-containing solution which comprises saturating such solution with carbon dioxide under pressure in excess of about 4 atmospheres, oxidizing such saturated solution to liberate free bromine therein, reducing the pressure on the solution to between about 2 and 3 atmospheres to cause an evolution of carbon dioxide which simultaneously vaporizes a portion of the bromine, vaporizing residual bromine from the brine by passing the evolved carbon dioxide gas in contact therewith, and separating the bromine vapors from the accompanying carbon dioxide gas.

6. A process of extracting bromine from a bromide-containing solution which comprises saturating such solution with carbon dioxide under pressure in excess of about 4 atmospheres, oxidizing such saturated solution to liberate free bromine therein, reducing the pressure on the solution to between about 2 and 3 atmospheres to cause an evolution of carbon dioxide which simultaneously vaporizes a portion of the bromine, vaporizing residual bromine from the brine by passing the evolved carbon dioxide gas in contact therewith, separating the bromine vapors from the accompanying carbon dioxide gas, recompressing such gas and returning the same to the first step.

7. A process of extracting bromine from a bromide-containing solution which comprises saturating such solution with carbon dioxide under pressure in excess of about 4 atmospheres, oxidizing such saturated solution to liberate free bromine therein, reducing the pressure on the solution to between about 2 and 3 atmospheres to cause an evolution of carbon dioxide which simultaneously vaporizes a portion of the bromine, vaporizing residual bromine from the brine by passing the evolved carbon dioxide gas in contact therewith, separating the bromine vapors from the accompanying carbon dioxide gas, releasing the pressure on the debrominated brine to recover additional carbon dioxide therefrom, adding such carbon dioxide to the previously debrominated gas, recompressing the gas and returning to the first step.

8. A process of extracting bromine from an alkaline bromide-containing solution which comprises oxidizing the solution in amount equivalent to the bromide content thereof, acidifying the oxidized solution by saturating with carbon dioxide under a pressure of at least two atmospheres to liberate free bromine therein and vaporizing such bromine from the solution by blowing out with carbon dioxide under a like pressure.

JOHN J. GREBE.
LEONARD C. CHAMBERLAIN.